United States Patent [19]
Harker

[11] 3,735,247
[45] May 22, 1973

[54] METHOD AND APPARATUS FOR MEASURING FAT CONTENT IN ANIMAL TISSUE EITHER IN VIVO OR IN SLAUGHTERED AND PREPARED FORM

[75] Inventor: Wesley H. Harker, Paradise Valley, Ariz.

[73] Assignee: The Emme Company, Glendale, Ariz.

[22] Filed: Oct. 4, 1971

[21] Appl. No.: 186,058

[52] U.S. Cl. ................. 324/34 R, 17/1 R, 119/1 R, 128/2 R
[51] Int. Cl. ............................................. G01r 33/12
[58] Field of Search ............................ 324/34 R, 40; 17/1 R; 119/1 R; 128/2 R, 26, 2 G, 2.05 V, 2.1 R, 2.1 E, 2.1 Z

[56] References Cited

UNITED STATES PATENTS

| | | | |
|---|---|---|---|
| 2,362,774 | 11/1944 | Romanoff | 324/40 |
| 2,667,159 | 1/1954 | Goldberg et al. | 128/2.05 V |
| 2,763,935 | 9/1956 | Whaley et al. | 128/2.1 R |
| 3,080,507 | 3/1963 | Wickerham et al. | 324/34 R |
| 3,224,320 | 10/1965 | Knudsen | 17/1 R |

OTHER PUBLICATIONS

Winters, S. R.; Electronic Egg Grader; Radio–Craft; Sept. 1947, pp. 22 and 61

*Primary Examiner*—Robert J. Corcoran
*Attorney*—William C. Cahill, Samuel J. Sutton, Jr. and Edwin M. Thomas et al.

[57] ABSTRACT

A method is presented and apparatus disclosed which permits very accurate measurement of the fat-to-lean ratio of meat, whether in vivo or in prepared form. The animal or meat package to be analyzed is subjected to a varying electromagnetic field generated by applying a radio frequency signal to a solenoidal coil through which the sample passes longitudinally. Because of difference of electroconductivity and dielectric properties between various body components, the load observed by the source which drives the solenoidal coil takes on a different value from that of the empty sample zone. By utilizing other predetermined parameters of the sample, the load difference may be utilized to infer the fat-to-lean ratio to a commercially acceptable standard.

11 Claims, 8 Drawing Figures

Patented May 22, 1973
3,735,247
5 Sheets-Sheet 1
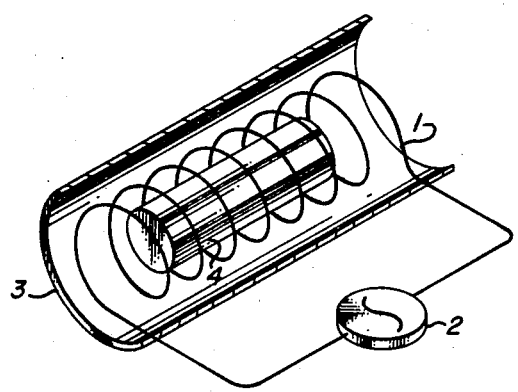
Fig.1
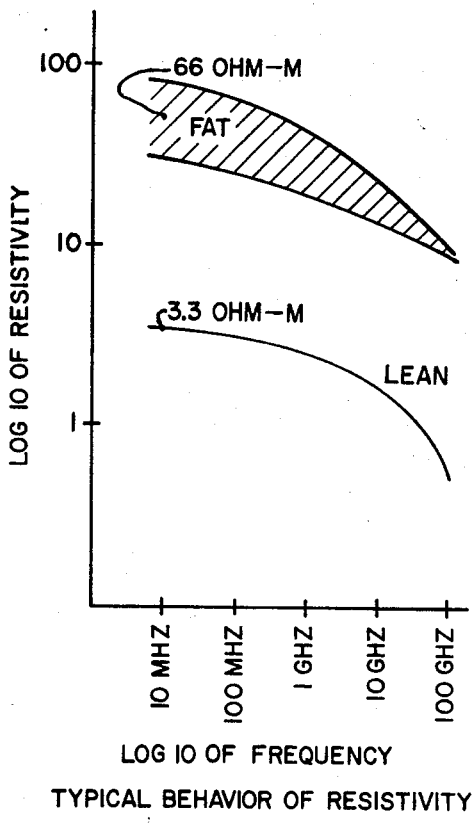
LOG 10 OF FREQUENCY
TYPICAL BEHAVIOR OF RESISTIVITY
Fig.2
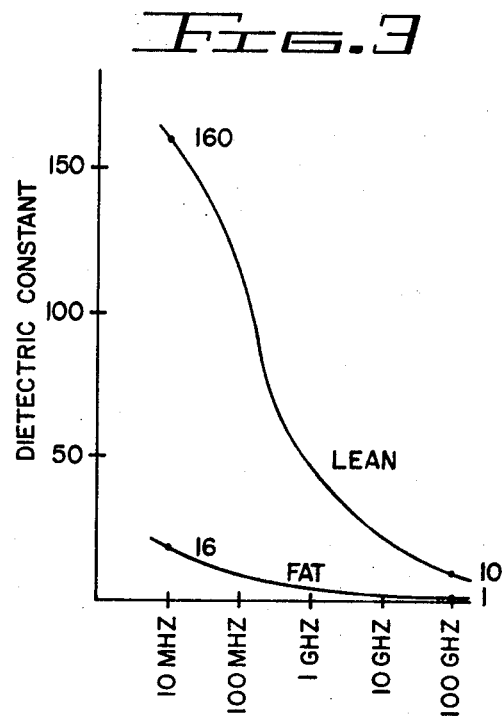
LOG 10 OF FREQUENCY
TYPICAL BEHAVIOR OF
DIETECTRIC CONSTANT
INVENTOR.
WESLEY H. HARKER
BY
Cahill Sutton Thomas & Phillips
ATTORNEYS

INVENTOR.
WESLEY H. HARKER

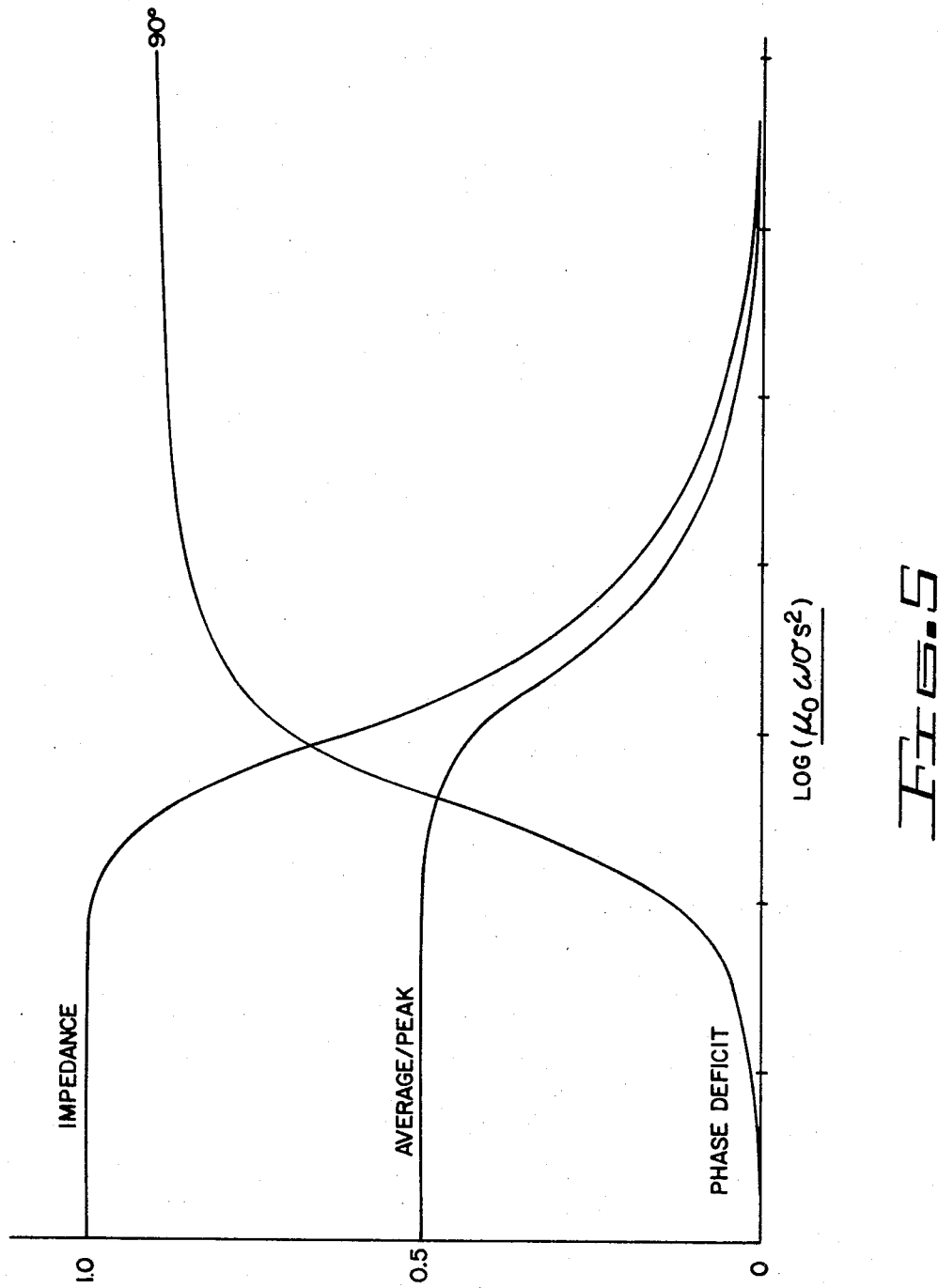

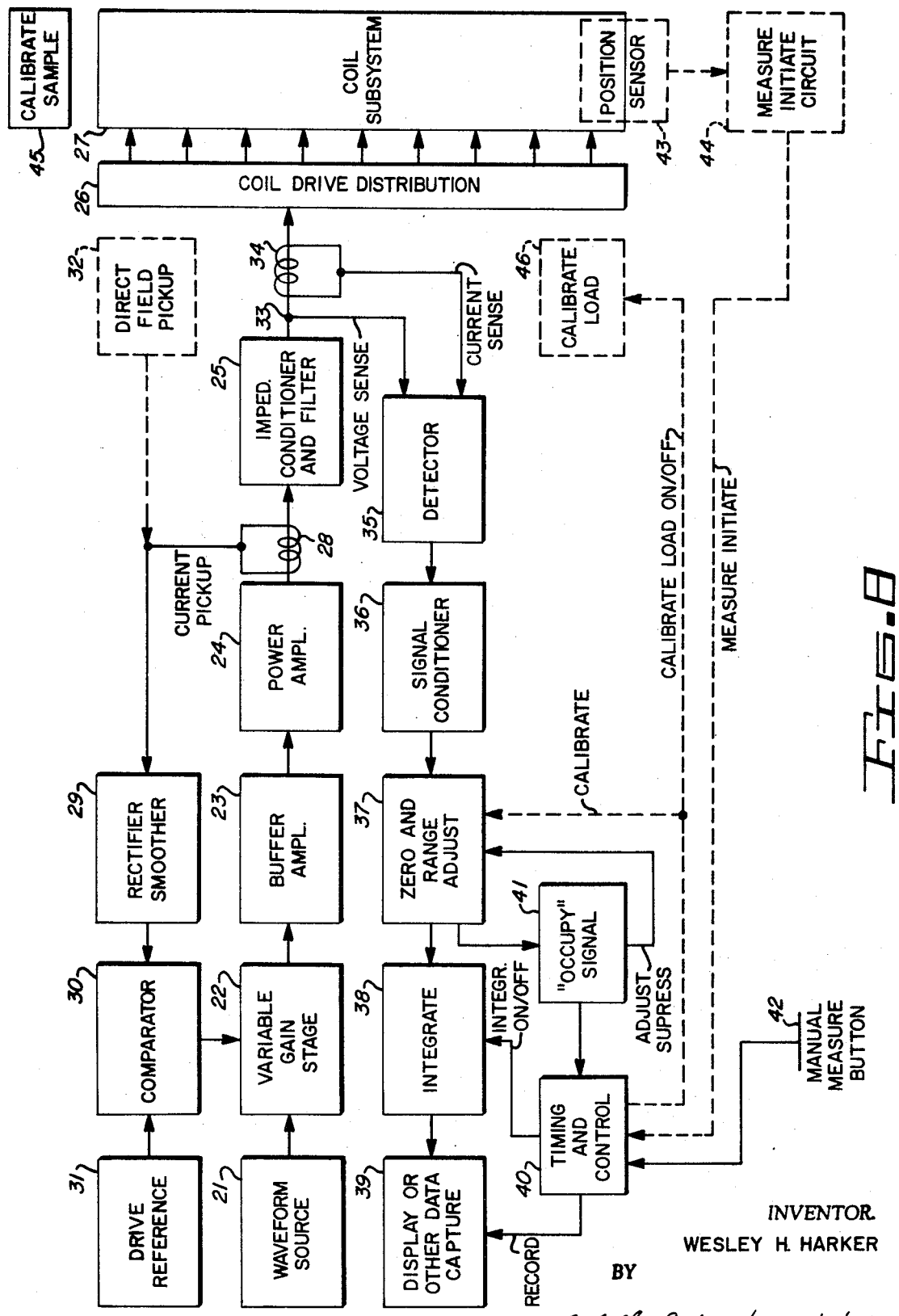

METHOD AND APPARATUS FOR MEASURING FAT CONTENT IN ANIMAL TISSUE EITHER IN VIVO OR IN SLAUGHTERED AND PREPARED FORM

This invention relates to the measurement arts and, more particularly, to method and apparatus for determining the fat-to-lean ratio of meat.

Recent studies in the field of health and more have lead to an increase in the value of lean meat over fat. Thus, the value of an animal to a meat processor is very closely related to the percentage of lean meat contained in the animal. The processor has had no truly reliable rapid method to determine the lean weight in animals offered for sale to him and usually relies simply upon human judgment. Similarly, the breeder of animals has been forced to slaughter a part of each generation in order to determine their meat quality. However, because lean characteristics have a heritability of only approximately 45 per cent, the siblings of the slaughtered animal often do not possess the analyzed quality. As a result, a time span of perhaps five years may pass before a breeder becomes fully aware that an inadequate animal has been chosen as a sire.

It will therefore be appreciated by those skilled in the art that apparatus capable of accurately indicating fat-to-lean ratio of a sample, including a living animal, without physical contact and in a completely nondestructive manner would be highly desirable, and the method and apparatus of the present invention are directed to this end.

It is therefore a broad object of the present invention to provide method and apparatus for accurately measuring the average percentage of fat in a sample of animal tissue.

It is another object of this invention to provide apparatus for accurately measuring the fat-to-lean ratio of a living animal without physical contact and in a nondestructive manner.

A further object of this invention is to provide animal breeders with accurate means for selecting animals to retain for breeding purposes.

Yet another object of this invention is to provide meat processors with means for determining the quality of an animal prior to its purchase.

Contemporary emphasis in animal nutrition is directed toward providing maximum weight gain because no adequate means exists to inexpensively and rapidly determine the lean content of a growing live animal. Those skilled in the art appreciate that an optimum feed regime would be directed toward maximizing lean weight gain.

It is thus yet another object of this invention to provide animal, including human, nutritionists with means to optimize the lean weight gain rather than the gross weight gain in accordance with specific diets.

Yet another object of this invention is to provide researchers in animal science and human nutrition to measure body fat in living specimens on a routine basis.

Yet a further object of this invention is to permit such routine measurements without immobilization or anesthetization of the subject.

Still another object of this invention is to provide method and apparatus for measuring meat during and after the processing cycle to permit accurate mixing to a predetermined fat content and to determine the meat quality and value.

The manner in which these objects are achieved will be understood through a consideration of the following specification and the drawing of which:

FIG. 1 is a schematic diagram of a shielded solenoidal coil driven by a time varying current source depicted with a sample to be analyzed disposed within the electromagnetic shield;

FIG. 2 is a graph illustrating the relative conductivities of fat and lean meat as a function of frequency;

FIG. 3 is a graph illustrating the range of dielectric constants of lean and fat meat with respect to frequency;

FIG. 5 is a graph illustrating three functions of importance in understanding the present invention with respect to a parameter related to the electromagnetic characteristics of the apparatus constituting the present invention;

FIG. 8 is detailed diagram illustrating the electronic and electromagnetics of a presently preferred embodiment of the invention including certain options and alternatives which had been found useful for specific applications.

Figure 4:
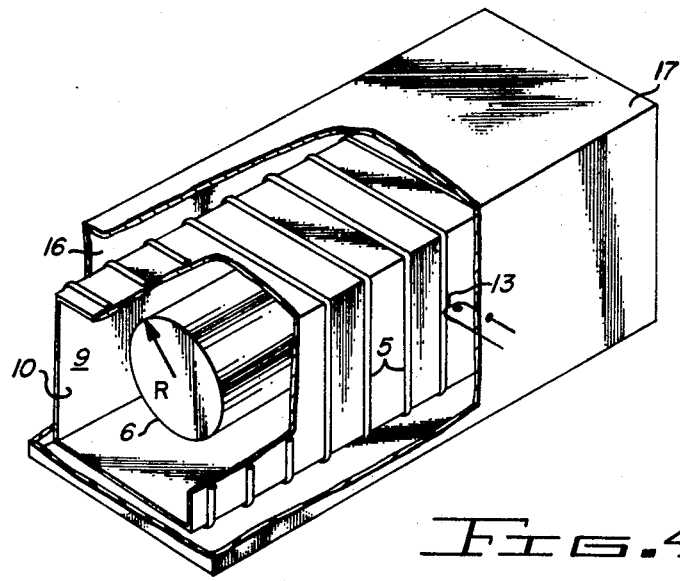
FIG. 4 is a partially cut away representation of an idealized form of the field generating subsystem of the present invention.

Briefly, in accordance with a presently preferred embodiment of the invention, the animal or meat volume is placed inside along the axis of a long electrically conducting coil. The coil is shielded by good electrically conductive material to guard against extraneous influences, and the shield is open at both ends to allow entrance and egress of the animal or sample. For accurate operation in measuring whole sample fat, the coil extends well beyond the ends of the sample and the shield beyond the ends of the coil. The fundamental measurement technique consists in measuring either the change in resistance or the change in total impedance between the empty and occupied coil as seen by the source driving the coil. This change, expressed in a suitable form such as ohms, phase angle, complex admittance or other forms known to those skilled in the art, is then used, in conjunction with the weight, to calculate the amount of fat in the sample. Predetermination of additional parameters, such as the width of the sample, can be used to improve the accuracy of the measurement, although highly satisfactory results are routinely obtained from knowing simply the weight and species of a living animal. The calculation may be carried out by hand using appropriate mathematical formulas, with a prepared nomograph, by using a set of specially prepared tables, or by incorporating appropriate analogue or digital computing circuits in the apparatus itself.

The measurement action is based on the differing electrical properties of lean and fat animal tissue. The conductivity of lean tissue, than viscera and, in vivo, the skeleton is much higher than that of the fatty tissues. Over frequencies ranging from 100 kiloHertz to 10 gigaHertz, this ratio will typically be between 5 and 100. A second electrical property of interest is the relative dielectric constant. Over the above frequency range the ratio of lean to fat dielectric constants will typically lie between 1.1 and 10.

By creating time varying electric and magnetic fields in the sample, currents are induced in the sample. These currents cause power losses and phase shifts that are reflected back into the field source as resistive and reactive changes caused by the sample's presence. Depending on the configuration of the driving fields and the sample size and weight, the changes are interpreted in terms of lean content. If the sample is not a live animal then the approximate temperature of the meat may also be required for an accurate reading.

More specifically, the majority of body cells contain electrolyte while fat does not. Thus, fat has a much lower electrical conductivity than lean meat. For example, at a frequency of 10 megaHertz, lean conducts approximately twenty times as well as fat. Similarly, the dielectric constants differ, fat having around one-tenth that of lean. The conductivities and dielectric constants both vary with frequency, but it has been found that the ratios between the values for fat and lean stay relatively constant. Presently, available experimental evidence is rather sparse, but apparently, as previously noted, the bone and viscera have conductivities, in vivo, near that of lean. Thus, a measurement of whole body conductivity is closely equivalent to determining the fraction of body fat.

The average electrical conductivity of the sample on a homogeneous volumetric basis is:

$$\sigma = f\sigma_f + (1 - f)\sigma_l.$$

Similarly, the average relative dielectric constant is:

$$\epsilon = f\epsilon_f + (1 - f)\epsilon_l.$$

In the above formulas, $\sigma$ is electrical conductivity in mhos per meter, $\epsilon$ is the relative dielectric constant and $f$ is the fraction of fat. The subscripts $f$ and $l$ stand for fat and lean, respectively. These equations are not exact because of the effect of boundaries and other heterogeneities within meat. They are qualitatively correct, however, and serve to guide interpretation of experiments.

From the foregoing, those skilled in the art will understand that the measurement of the average conductivity or dielectric constant would lead to the determination of $f$, the fat fraction. Detailed corrections for heterogeneous and other second order effects can be determined either on an empirical basis or by applying detailed theoretical considerations. Several methods for measuring the approximate average electric constants have been considered and each is useful over some range of sample and application type. Before a detailed description of the presently preferred embodiment of the invention is presented, the following discussion will serve to sharpen the differences between the alternatives, some of which have been considered in the prior art.

Capacitive or direct coupling is the classical approach to the measurement of dielectric constant. Generally, such measurements are carried out with a carefully controlled sample geometry. The drive electrodes are either in direct contact with the sample or separated from it by a small insulating layer. For accurate measurements of ground meat samples, this is a useful approach. The method is, however, very sensitive to small dimensional variations and included boundaries within the sample. In live animal measurements, problems arise from the variation of shunt capacitance from animal to animal. The designs to correct these problems deposit only a tiny fraction of the field energy within the animal resulting in a small signal in high background measurement problem. Direct contact has the additional problems of securing a uniform current density within the sample as well as contact potential and (animal) skin effects.

Radiative coupling is that in which the sample interacts with an electromagnetic radiation field from source within a controlled enclosure. Such an interaction affects the loading of the source and is thus susceptible of interpretation in terms of the sample's physical characteristics. Again this technique is effective for small, controlled geometry samples. In general, the need for high radio frequencies to generate a good signal leads to problems. First, a thick sample absorbs all the radiation in the surface layers leaving the interior unmeasured. Second, large samples have dimensions equivalent to many wavelengths resulting in high sample position sensitivity.

Inductive coupling deals with then near field of source. The test geometries can best be described in terms of the induced magnetic field. A solenoid coil (or a pair of Helmholtz coils or other conductor configuration) carries a time varying electric current. The current creates a region of time varying magnetic flux. Any object within this region will have an electric field induced in it which in turn causes power to be dissipated if a finite conductivity is present. The inductive coupling method is convenient because of the ease of constructing large test regions and the relative insensitivity to other perturbing factors such as the air gap between the sample and the drive coil. The field, however, must be carefully shielded to minimize extraneous influences, and the drive coil must be relatively long compared with the sample to provide a spatially uniform sampling field. The induced sampling voltage in the most natural configuration, the solenoid coil, increases with sample radius requiring careful interpretation. The inductive field approach, in the broad sense, offers the most convenient live animal technique.

As mentioned in the foregoing, drive coils can take many configurations depending upon the application. For high rate, live animal or meat sample measurements, the axial solenoid coil has been determined to be an excellent configuration. It is easily shielded and driven, and by proper design a reasonably large axial uniform field zone can be generated. All the important field configurations for the axial solenoid coil can be resolved into two components, the transverse magnetic component with electric field lines parallel to the axis (TM) and the transverse electric component with the magnetic field lines parallel to the axis (TE). The TM mode has a considerable advantage in that the electric field remains constant with changing radius. This permits easy interpretation of the readings and reduces the effect of radial sample anomalies. Unfortunately, at the frequencies of interest, solenoid coils of the requisite dimensions function as wave guides operating below cutoff. As a consequence, it is very difficult to generate a uniform TM mode. Large drive currents must be applied and great care must be taken to maintain uniform coil conductor thickness.

Thus, while other approaches are possible, the TE mode for the animal measurement instrument constitutes the presently preferred method and apparatus of the invention. The TE mode is generated by driving a spiral coil wound in a solenoidal configuration. Although a practical embodiment may differ from a simple constant radius solenoid with a uniform spiral winding, all of the basic principles involved in the invention can be understood through its analysis.

Consider the uniform constant radius spiral solenoidal coil 1 being driven by a sinusoidal current generator 2. The coil 1 is surrounded by a good electrical shield 3 on the outside to prevent interference with the measurement and to minimize radiation. A cylindrical test sample 4 is introduced within the coil. Maxwell's equations can then be solved throughout the system and the effect of the sample 4 on the load current predicted. The general solution is quite complicated mathematically. For the frequencies of interest, however, a very good approximation can be reached by neglecting the effect of the currents induced in the sample on the shape of the drive field. This is the so-called quasistatic approximation.

Within the test volume a spatially uniform magnetic induction B is created with force lines parallel to the axis:

$$B = B_o e^{j\omega t}$$

Where:
 B is the time varying induction,
 $B_o$ is the induction amplitude,
 $\omega = 2\pi\nu$ the angular driving frequency,
 $j$ = square root of $-1$. Throughout the volume containing B, a coexisting electric field is created:

$$E = -\tfrac{1}{2} j\omega B_o r e^{j\omega t}$$

Where: $r$ is the radial distance from the axis. The power induced in a uniform homogeneous sample is:

$$P = 2\pi \int_0^R \sigma E^2 r \, dr$$
$$= (\pi/8) B_o^2 \sigma \omega^2 R^4 L$$
$$= (\pi/8) B_o^2 \sigma \omega^2 (W/\rho) R^2$$

(1)

Where:
 R is the sample radius,
 L — the sample length,
 W — the sample weight,
 $\rho$ — the sample density.

Equation (1) is a good approximation to the influence of each variable on the real part of the load impedance. If the change in the reactive component is desired, the analysis must be extended to include the effects of the currents induced in the sample. A rough calculation shows:

Resistance/Reactance = $1/6 \, \mu_o \sigma \omega R^2$ (2)

Where: $\mu_o$ is the permeability of free space.

Because equation (1) is valid only when $\sigma\omega R^2$ is small the change in reactance is second order to that in resistance.

Possible measurement variables can be inferred from the above discussion. Measurement of power, resistance, reactance, phase angle or resonance frequency change with sample introduction all serve to deduce the conductivity and, as a result, the fat fraction from equations (1) or (2). Multiple frequencies and pulsed drive techniques also suggest themselves. In the presently preferred apparatus, a combination of power and phase measurement techniques is used because of engineering and economic considerations although this choice is not basic to the heart of the invention.

In the engineering, manufacturing, and use of the apparatus, several conflicting requirements are placed on he available design variables. These constraints, once recognized, give limited ranges for optimum operation as well as introducing other considerations into the design. For example, from equation (1), it will be apparent that the power rises as the square of the frequency due to the increase of induced electric field. In addition, the conductivity may also increase. Thus, the sensitivity increases with increasing frequency. A more thorough analysis shows, however, that a better approximation to the behavior gives power as proportional to the real part of:

$$-j \, (2\omega/pR) \, [J_1 \, (pR)]/[J_o \, (pR)]$$

Where: $J_o$ and $J_1$ are Bessel Functions, $$p^2 = k^2 \epsilon + j\mu_o \omega \sigma,$$
$$k = \omega/c, \, c,$$

c is the velocity of light.

(3)

For reasonably small values of the argument, the above formula predicts the power rising with the square of frequency. As frequency continues to increase, however, the power will go through a succession of maxima and minima. Also the power will be more and more concentrated in the surface layers so that the internal composition will have little influence on the reading. The balance to be made for whole body reading is between signal strength, requiring high frequency, and good averaging of the sampled volume, requiring low frequency. A second practical consideration is the difficulty of balancing current distribution in large systems at high frequencies.

A useful range is set by the parameter $\mu_o \omega \sigma b^2$, when the displacement current term is small. This parameter is about twice the square of the ratio of sample radius to skin depth. For reasonable power without serious self shielding, the parameter can range from perhaps 0.01 to about 35. At the upper limit, the self shielding is about 50 percent. Operation at higher frequencies can be used to deliberately focus on the outer regions or, by differencing, on the inner regions. By way of example, a hog-sized machine according to a presently preferred embodiment, operates at 5MHz, and a smaller machine for analyzing 60-pound boxes of beef operates at 10MHz.

Equation (1) can be rewritten displaying the dependence of power on sample geometry as $R^4 L$. The fourth power of sample radius arises because both the amount of material to conduct electricity and the amount of magnetic flux coupled both increase as the square of the sample radius. The typical sample in actual practice is not a perfect section of a right circular cylinder. Hence, two external sample shape effects influence the reading; viz.: the coupling to the field and the non-cylindrical shape of the sample. Of course, for a fixed sample shape such as a box, these factors are constant and can be calibrated out.

However, for the measurement of live animals, even though there is considerable individual variation, the general topology is the same. This problem has been studied in terms of idealized solids, and it has been determined that a fairly general heuristic form can be used to approximate the effect. If the ratio of the shape corrected power to the perfect cylindrical power is written as S, then a reasonable approximation to S will have the form:

$$S = C_1 + C_2 (W)/(\rho dwL), \quad (4)$$

Where:
$C_1$ and $C_2$ are general constants,
$w$ is maximum body width,
$d$ is maximum body depth.

Although $C_1$ and $C_2$ can be analytically estimated, in practice it is more satisfactory to determine them experimentally. It will be noted that the measurement of the width $w$, the depth $d$, and the length L are required for the use of this correction. For high speed, slightly lower accuracy fat-to-lean measurements, these factors in turn can be adequately estimated from a knowledge of the animal's species and weight.

Although the shape correction factors are basically concerned with volume, as is the basic measurement itself, it is usually practical to only measure the weight. The volume, $V$, is related to the weight as:

$$W = \rho V.$$

The density of fat will range a few percent below 1.0 and that of lean a few percent above. Writing $\sigma_f$ and $\sigma_l$ for the densities of fat and lean, respectively:

$$V = W/[f\rho_f + (1-f) \rho_l].$$

The difference between the two densities is small and can be ignored for most of the measurements contemplated.

In the foregoing discussion, the tacit assumption has been made that the sample is homogeneous; i.e., the fat and lean being uniformly distributed. In a real animal this is by no means the case. While, in general, the topological distribution is the same from animal to animal, there are variations due both to congenital and environmental factors as well as those due o differences in fat volume. The most significant manifestation of the latter is in the outer body far covering. This covering is also at the most sensitive radial point to influence the reading.

A suitable approximation has been found by treating the animal as two concentric cylinders, the outer one of almost pure fat and the inner one composed of lean with some fat mixed in. The ratio of power with a heterogeneous configuration to that of a homogeneous configuration, $I$, has the from:

$$I = K(1-f) [1-(1-\gamma)f] + 1/[K(1-f) + 1], \quad (5)$$

Where: $K = (\sigma_l - \sigma_f)/\sigma_f$,
$\gamma$ = the fraction of body fat found in the lean central region.

For fat fractions below 50 percent equation (5) can be placed in more convenient form:

$$I = 1 - [K_f(1-\gamma)]/[K + 1].$$

The conductivity and dielectric properties of matter are usually a function of temperature. In the live animal this is not series because the homeostasis of mammals keeps the temperature within a narrow range for each individual, and the variations between individuals of a breed or species are minimal. For fresh, prepared meat measurement, the temperature may have to be separately determined. For example, in beef, the correction is around 0.75 percent fat per degree Fahrenheit.

Additional sources of variation in the conductivities and dielectric properties are the congenital and environmental effects mentioned above, the effects of different feed regimes, the animal's emotional state, etc. No serious errors have been observed from these supplementary factors.

In measuring live animals certain additional factors must be considered. Measurement rate may be traded off against measurement accuracy. For high accuracy, the animal may be stopped momentarily with doors or other barriers. He may even be totally immobilized with drugs. To measure the animal in motion passing through the machine at his normal gait, which the apparatus disclosed below is capable of doing, the detailed output versus time may be recorded for later interpretation. Alternatively, a position sensing system may be used to initiate a single reading, or the output may be integrated over a given length of time or over a given length of the instrument.

There are three prime sources of measurement variation with the live animal: the bunching and unbunching of muscle groups during motion, the breathing, and the time variation of the average radial moment of the blood volume. In order to provide sufficient integration to average out some of these effects, the animal must either be halted or the tube must be relatively long. For example, for hogs, an eight foot tube with a 0.5 second integration time gives good results on moving animals as will be explained in further detail below.

In the foregoing discussion, some of the factors influencing the output of the device have been outlined and an indication of the approach developed to control or correct for each factor given. In the following, the approaches used to obtain practical results in a specific reduction to practice are discussed. To briefly summarize, the animal is placed in a time varying electromagnetic field. The field induces electrical currents within the animal. The phase and magnitude of these currents relative to the drive field are determined mostly by the gross effective lean meat mass of the subject. Other effects, however, modify the apparent circuit load due to the animal. Among these are internal structure, external body geometry and muscle and blood pool motion. Precise measurement requires immobilization of the animal plus detailed measurements of body dimensions including perhaps the thickness of the outer fat layer. Both analysis and experimental results show, however, that standard errors well within present practice can be obtained by measuring animal weight and its loading effect on the circuit only. The remaining measurements can be used to extend the accuracy well beyond that achieved by the disclosed apparatus for those applications in which such precision is required.

Collecting the results of the above equations together into one basic equation gives:

$$P = \frac{\pi B_o^2}{8} \frac{R^2}{R_c^2} \frac{W\sigma_1}{\rho_l f} \left[ \frac{(1-\delta+\delta f)(1+K-Kf)}{K+1} \right]$$

$$\left[ 1 - \frac{Kf(1-\gamma)}{K+1} \right] \left[ C_1 + C_2 \frac{W(1-\delta+\delta f)}{\rho_l V_c} \right]$$

(6)

Where:

$V_c$ is the perfect cylindrical volume, $\delta$ is the density sensitivity ratio = $(\rho_l - \rho f)/\rho f$ Equation (6) is the low frequency approximate design equation for the system. If appropriate values for the variables are known, the predictions it makes are accurate within a few tenths of a percent.

In cases where less accurate measurements are required and where a high measurement rate is needed, the several parameters such as $V_c$ and $\gamma$ can be estimated in a different manner.

First, equation (6) is reduced to a form almost as accurate, but more manageable. $1 - \gamma$ is effectively measured by the thickness of the outer covering layer. Approximately:

$$1 - \gamma \alpha \ (RTL)/fW \ \alpha \ T/(fR)$$

Using this, the heterogeneity bracket in (6) has the form:

$$1 - KT/[(K+1)R]$$

A second practical problem in the utilization of equation (6) is to estimate the perfect cylindrical volume, $V_c$, from the animal's weight. Experience has shown that an equation of the form $$W = C_3 V_c$$

gives relatively accurate results. Thus, incorporating all of these considerations into equation (6), a practical "accurate" form of the basic equation is:

$$E = C_4 R^2 W(1 - C_5 f)(1 - C_6 T/R)$$

(7)

where $E$ is the "EMME" number, and $C_4$, $C_5$, $C_6$ are species dependent constants, and because these "C" constants are affected by such factors as dressing practice or chemical analysis technique embedded in their values, they are best determined empirically by close inspection of slaughtered animals which have been analyzed by the apparatus.

For higher measurement rate it is possible to reduce the accuracy somewhat and estimate T and R from the weight and the EMME reading only. With respect to T, the fat covering thickness, the ratio of T to the total radius R can be deemed to be linearly related to the fat fraction, $f$. R, in turn, is related to the cube root of the total volume or the weight. These considerations lead to the following equation involving only E, W and $f$.

$$E = C_7 W^{5/3}(1 + C_8 f + C_9 f^2).$$

(8)

(8) gives f in implicit relationship to $E$ and $W$. The last step is to approximately invert this relation.

$$f = C_{10} + C_{11} E/W^{5/3}$$

(9)

Equation (9) has been applied to the high rate measurement of market weight hogs. On single animals it predicts lean cut weight with a correlation coefficient of around 0.9. Used on a multiple animal batch basis, batch accuracies of better than one percent are achieved.

It also will be apparent to those skilled in the art that a machine which automatically determines the dimensions by photoelectric or other means, the backfat by ultrasonic or other means and/or the weight by load cells or other means can be incorporated into the apparatus to process animals both at high rate and high accuracy.

As previously noted, the behavior of resistance in both the fat and lean potions of meat varies with frequency. Over frequencies ranging from 100 kiloHertz to 10 gigaHertz, the ratio between fat and lean will typically be between 5 and 100. FIG. 2 is a graph depicting the resistivity/frequency characteristics of the frequency range of interest. Similarly, as also noted above, the relative dielectric constants of lean and fat also vary with frequencies, and FIG. 3 illustrates empirically determined values in the frequency range of interest.

The somewhat idealized configuration of the measuring apparatus shown in FIG. 4 may be analyzed to provide a formula which has proved accurate in practice. The coil 5 is taken to be solenoidal in nature so that the interior magnetic field lines are dominantly parallel to the coil's axis. The impedance reflected into coil 5 by a homogeneous sample 6 is approximately proportional to:

$$jA^{1/2}\left[2 - A\left(2 - \frac{2J_1(ps)}{psJ_o(ps)}\right)\right] \quad (10)$$

where $A$ is the ratio of sample average cross-sectional area to coil cross-sectional area.

$s$ is the sample radius $p^2 = k^2 + j\omega\mu_o\sigma$ is the complex propagation constant $k$ is the free space propagation constant multiplied by the square root of the relative dielectric constant.

$j$ is the square root of $-1$.

$\mu_o$ is the permeability of free space.

$\omega$ is $2\pi$ times the source frequency.

$\sigma$ is the conductivity of the sample.

The behavior of this formula versus frequency of the driving source for $A = 1$ is shown in FIG. 5. Inspection of FIG. 5 demonstrates that a rather limited range of the parameter $\mu_o\omega s^2$ gives useful sensitivity. Note that this parameter is proportional to the square of the ratio of sample radius to sample skin depth. A second factor limiting useful frequency range is, of course, the self shielding of the sample at high frequencies. The curve labeled "Average-to-Peak Power" is indicative of the extent of this effect. It should be pointed out that, if only the surface regions of the sample are of interest, the higher frequency ranges can be used effectively. For example, consider a machine according to FIG. 4 which is intended to measure live swine. A typical coil cross-section would be on the order of 16 by 24 inches to accommodate animals ranging up to 350 pounds. For these conditions, as will be evident from FIG. 5, a frequency between 1 and 20 megaHertz may be selected to give useful results.

Of course, more than one discrete frequency can be used to drive the coil 5 to effect the measurement, and in this manner, differences between geometry and material composition may be resolved. Pulsing or other time modulation techniques may be used to accomplish the same purpose.

Figure 6:
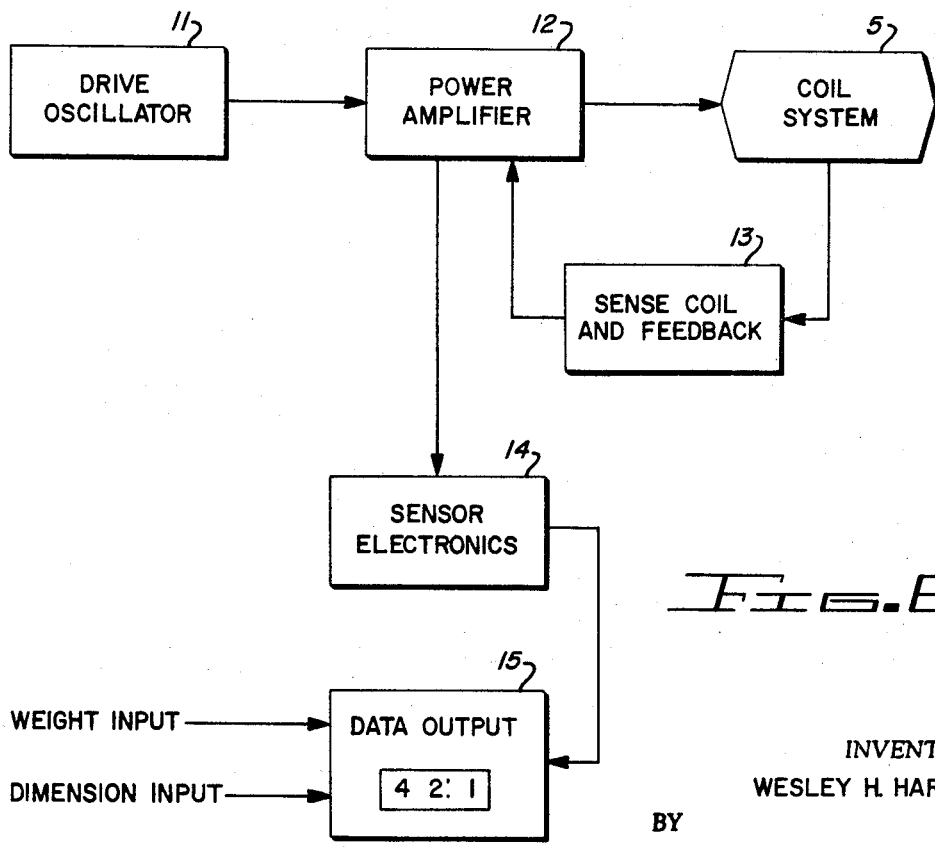
FIG. 6 is a major block diagram illustrating broadly the manner in which the method and apparatus of the present invention may be practiced.

FIG. 6 is a major block diagram of the electronics utilized in typical embodiment of the invention. The drive oscillator 11 provides a precisely controlled frequency voltage signal to a power amplifier 12. The power amplifier 12 uses this signal to produce a precisely controlled drive current to the coil system 5 (FIG. 4). A feedback sense coil 13, positioned in or near the sample volume, provides a feedback signal to the power amplifier 12 so that the amplifier maintains a constant drive current. Sampling the voltage across the coil system and comparing it to a reference signal from the power amplifier 12, a phase sensor 14 develops a signal proportional to the effect of the sample within the coil 5 compared to an unoccupied condition. Inputs for sample weight and sample transverse dimension are provided to data reduction subsystem 15 along with the signal from the phase sensor. The data reduction subsystem then computes and displays the approximate lean weight and/or lean percent. It may be noted that, in the case of transverse magnetic drive with a coaxial cylinder rather than a coil, the transverse dimension input may be omitted for equivalent accuracy.

Depending on the form of the sample, i.e. live animals, carcass parts or processed meat, different handling and positioning mechanisms are provided to expedite sample flow.

Referring again to FIG. 4, a typical machine can be reviewed. The live animal or package of meat products are introduced into measuring volume 9. For animal use the measuring volume is usually a straight through tube open at both ends. Sampling magnetic and electric fields are induced into the volume 9 by the transducer coil 5 which is wound or otherwise applied to a supporting structure 10. The coil 5 is electromagnetically excited by the drive chain illustrated in FIG. 6. Problems of mode shifting and impedance bypassing are corrected by directly sensing the magnetic field in the coil system's 5 sample space 9 or in the exterior region 16 between the coil structure 5 and an electromagnetic shield 17 by means of the feedback sense coil 13. This feedback signal is impressed on a variable gain or equivalent control element coupled to the power amplifier 12 to maintain constant sense fields current into the coil. Of course, other indicators of conditions in the sample volume may be used instead of direct field sensing.

Figure 7:
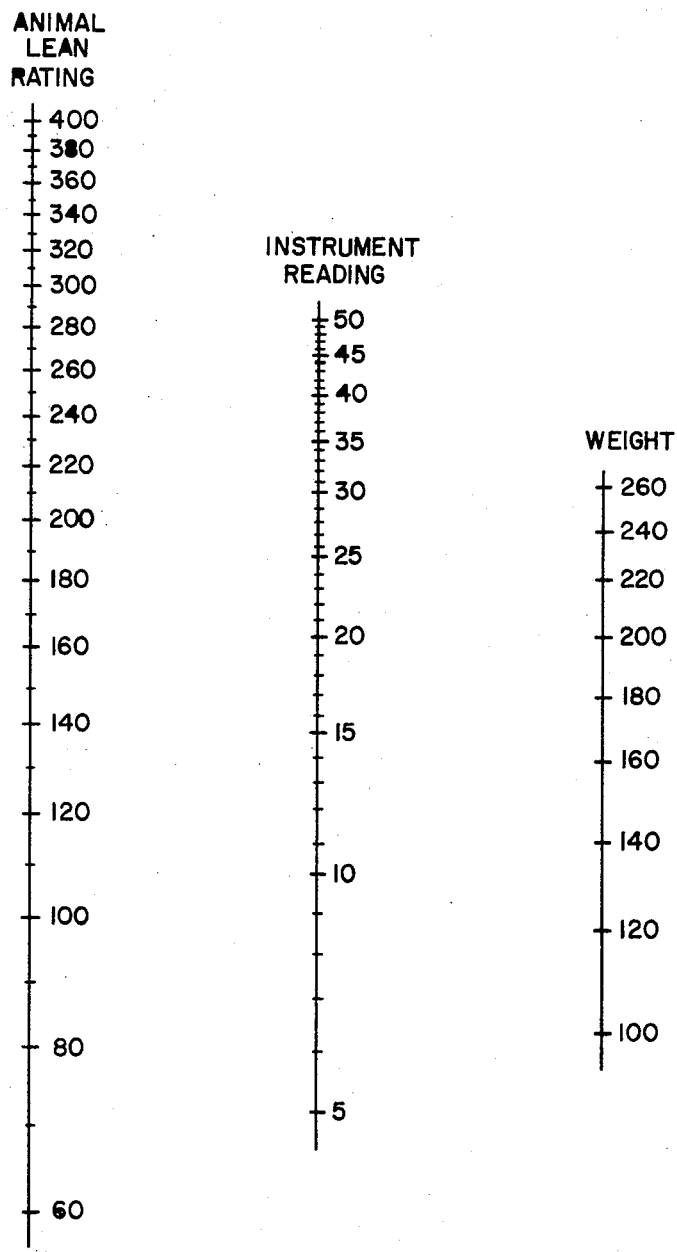
FIG. 7 is an exemplary nomogram presented as one method of reducing a measurement made by the apparatus to a value directly related to meat quality.

The electromagnetic fields in the sensing volume 9 are time varying. They therefore induce currents within any sample 6 within the sampling volume 9. The magnitude of these currents is roughly proportional to the applied drive current, the coil 5 turns per unit distance, the local cross-sectional area of the sample 6 (in the case of transverse electric drive), and the local conductivity of the sample 6. The local dielectric constant influences this induced current to some extent, but for illustrative purposes may be neglected. The induced currents cause energy loss in the form of Joule heating. This loss, in addition to the electrical inertia effect of the induced currents, is reflected back into the coil system 5 as a change in complex electric impedance. This impedance change or, equivalently, energy loss, is sensed by the sensor elecronics 14. Through the use of formula (1), a nomogram such as FIG. 7, the graph of FIG. 5 or equivalent analytical or graphic means, the parameter $\mu_o \omega \sigma s^2$ may be found. By factoring in the animal's or sample's weight and, if desired and practical, its dimensions the quantity $\sigma$, the conductivity is closely determined from which percent lean is the given as $$P_l = 100(\sigma - \sigma_{fat})/(\sigma_{lean} - \sigma_{fat}). \tag{11}$$

As noted above, the use of nomograms or appropriately designed or programmed computers can aid the computation process. Hence, the data output 15 may take many forms from a meter giving an unanalyzed quality number to a completely analyzed data output stream.

FIG. 8 presents a more detailed functional block diagram of a presently preferred implementation of the invention and also includes certain alternatives and optional elements for completeness in the following discussion. Two major systems are included in the electronics, viz.: the drive system which functions to excite the sensor volume within the coil subsystem 27, and the sense, interpret, and control system which functions to sequence, analyze, and display the results of the measurement.

The drive system commences with a waveform source 21 which is typically a single frequency oscillator although, for more versatile applications, it may issue, selectively, multiple frequencies or may provide more complex repetitive waveforms such as square waves. The signal issuing from the waveform source 21 passes through a variable gain stage 22 which has the purpose to maintain a constant drive output for the reasons previously discussed and described further below. The gain controlled signal is then amplified by a buffer amplifier 23 to raise the signal amplitude to a level sufficient to drive a power amplifier 24. The power handling capacity of the power amplifier 24 may range from about 0.1 watt to 100 watts depending upon the application contemplated and the size of the sensor volume.

The impedance conditioner and filter 25 may optionally be incorporated into the apparatus to permit tuning the coil subsystem 27 to or close to resonance in order that maximum current delivery may be achieved without unduly high voltage. Additionally, filter elements may be incorporated to remove any waveform distortion observed to have been introduced in the drive chain.

A sensing and feedback subsystem is utilized to maintain a constant drive to the coil subsystem 27, and two alternative sensing methods are presented in FIG. 8. The parameter best held constant is the magnetic field strength within the sensing volume. Recognizing that the magnetic field strength is, to a first approximation, proportional to the drive current, the drive current can be sensed with current transformer 28 or the like. The alternative, previously discussed in conjunction with FIG. 6, is the utilization of a direct pickup coil 32 within the shield or coil volume. Utilizing either type of sensor, the output signal therefrom is fed to a rectifier/smoother stage 29 which converts the detected signal to a slowly varying d-c signal which is proportional to the magnetic field amplitude. The signal issuing from the rectifier/smoother 29 is impressed as one input to a voltage comparator 30 which also receives an input from a previously calibrated drive reference source 31. The voltage comparator 30 continually compares the two input signals and, if the two differ in amplitude, functions to adjust the variable gain stage 22 in the appropriate direction to bring the amplitudes into correspondence.

In practical embodiments of the invention now being considered, the coil drive signal may usefully be fed into a coil drive distribution subsystem 26. Because the total length of the coil winding in the coil subsystem 27 may be several wavelengths long, a simple two connection feed system, as depicted in FIG. 6, may be impractical. The coil drive distribution subsystem 26 drives the coil subsystem 27 as several parallel coils or as a compound coil with several interlaced windings. The coil subsystem 27, which is contained within a suitable electromagnetic shield not shown in FIG. 8, converts the electric current from the drive chain into a time dependent electromagnetic field throughout the volume within the shield. As previously discussed, this induced field sets up electric currents within any conductive sample in the shielded volume, and the effects of these currents are reflected back to the drive chain where they may be interpreted as changes in reactance in the coil subsystem 27.

The primary function of the sense, interpret, and control system is to measure and interpret the changes in the impedance of the coil subsystem 27 brought about by the introduction of a sample into the electromagnetic field. Additional functions, such as the initiation, sequencing, and performance of calibration and correction adjustments to the apparatus may be incorporated.

The drive current to the coil subsystem 27 and the voltage impressed thereon are sensed, respectively, by current and voltage sensors 34 and 33. The signals sensed thereby are impressed upon the input terminals of a detector stage 35 which issues a d-c voltage signal which is proportional to the phase shift induced by the sample as well as the introduction of the change in impedance magnitude. Those skilled in the art will readily appreciate that alternative functions of the stage represented by the detector 35 might deliver signals proportional to change in power, change in real impedance, etc., which signals can be analyzed to extract the desired information. The signal issuing from the detector 35 is usually low level such that an amplification and signal conditioning stage 36 is useful. In order to ease circuit design problems in the succeeding stages, the stage 36 may advantageously incorporate a chopper to convert the d-c signal to a corresponding a-c signal.

In order to permit ready adjustment for system parameter changes, a zero-and-range adjust stage 37 may be provided, and may simply take the form of manually adjustable potentiometers. Thus, the zero output is set when the test volume is unoccupied, and a standard calibrated sample 45 is then placed in the test volume to permit making the range set adjustment. This procedure insures that all tested samples are reference to a standard for the measurement of their lean content. For those applications in which the environment in which the apparatus is utilized is expected to vary widely, automatic zero adjusting is desirable to mitigate the effects of drift. The stage 37 then includes a zero-seeking servo loop to adjust out any such drift. However, to prevent this circuit from altering the reading during a sample measurement, an "occupied" sensing circuit 41, which may be a simple photoelectric detector or the like, is used to determine that the test volume is occupied and therefore disables the automatic zero adjust function.

Similarly, an automatic range adjust may be usefully incorporated into the element 37. For this purpose, a timing and control circuit 40 institutes activity which causes a fixed calibrated load 46 to be inserted into the sensing volume at predetermined intervals. The "occupied" circuit 41, again, may be utilized to suppress this self-calibration function when the sensing volume is occupied by a sample being measured. The timing and control circuit 40, when instituting the range calibrated function, locks the zero adjust servo loop in the element 37 and enables a range servo loop therein which adjusts the range fed until a standard level output is achieved after which the automatic zero adjust mode is reenabled. These self-calibrating techniques are very well known to those skilled in the analogue computer arts.

The measurement signal issuing from the adjustment stage 37 may be impressed directly on an output stage 39 or first passed through an integrator 38. It has been determined that, in the case of live specimens where both body and blood volume movements induce perturbations in the measurements, it is helpful to integrate the signal over a period of time to provide a partial averaging effect. As a practical matter, the integration may be initiated by an operator's pressing a "measure" pushbutton 42 when he observes that the subject is in position. This causes the timing and control circuit 40 to activate the integrator 38 for a predetermined phase length of time which may range, for example, between 0.1 and 1.0 seconds for hogs. After the integrator has been deactivated, a record signal is issued to the display and data capture system 39 which holds the value for display on a meter, for printing, for recording on magnetic or paper tape, or other straightforward means for capturing the data. For example, the meter may be calibrated to give an EMME number for utilization with a nomogram of FIG. 7. Those skilled in the art will realize that analogue-to-digital conversion techniques can readily be incorporated to permit direct computation for providing direct lean percentage reading.

For high volume applications, such as may be encountered with a permanent installation at a packing house, automation of the measure initiating function is desirable and can readily be accomplished by utilizing a position sensor 43 which determines when the sample is in the optimum measuring position at which time a measure initiating circuit 44 starts the measurement cycle in substantially the same fashion as with the manual initiating button 42.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

I claim:

1. The method of measuring the fat-to-lean ratio of animal tissue comprising the steps of:

A. predetermining the effect of an animal tissue sample having known fat-to-lean ratios on a standard electromagnetic field of known intensity;

B. generating a test electromagnetic field of known intensity;

C. inserting a specimen of animal tissue having a fat-to-lean ratio to be measured into the generated test electromagnetic field;

D. measuring the effect of the specimen on the generated test electromagnetic field; and E. correlating the measured effect of the specimen on the test electromagnetic field to the predetermined effect.

2. The method of claim 1 in which the specimen of animal tissue to be analyzed is weighed.

3. The method of claim 2 in which the dimensions of the specimen of animal tissue to be analyzed are determined.

4. The method of claim 1 in which the electromagnetic field is generated by passing a time varying electric current through a conductor.

5. The method of claim 4 in which the effect of the specimen to be analyzed in the electromagnetic field is measured indirectly by measuring the difference in impedance reflected by the conductor without and with the specimen disposed in the electromagnetic field.

6. The method of claim 5 in which the shape of the electromagnetic field is controlled by configuring the conductor generally solenoidally.

7. The method of claim 4 in which the temperature of the specimen of animal tissue to be analyzed is determined.

8. Apparatus for measuring the fat-to-lean ratio of animal tissue comprising:

A. means for generating a time varying electromagnetic field comprising:
  1. a waveform generator,
  2. a coil, and
  3. means coupling the output of said waveform generator to said coil;

B. feedback means for maintaining the time varying amplitude of said electromagnetic field constant, said feedback means including:
  1. means for sensing and developing a field intensity signal proportional to the amplitude of said time varying electromagnetic field;
  2. means for generating a standard signal representing a predetermined electromagnetic field amplitude;
  3. comparator means for comparing said field intensity signal and said standard signal and for issuing a correction signal representative of the difference therebetween; and
  4. variable gain means included in said coupling means, said variable gain means being responsive to said correction signal to alter the gain of said coupling means whereby the voltage and current applied to said coil maintain the amplitude of said electromagnetic field constant;

C. detector means for measuring the impedance reflected by said coil by sensing the voltage and current applied to said coil; and D. means responsive to the difference in coil impedance with and without a specimen of animal tissue to be graded to provide a quality signal corresponding to said difference.

9. The apparatus of claim 8 in which said coil is solenoidally wound.

10. The apparatus of claim 9 in which said solenoidally wound coil is compound wound with a plurality of coil segments and said means coupling said waveform generator to said coil is adapted to feed said coil segments individually.

11. The apparatus of claim 9 in which said coil is surrounded by a shield to prevent factors outside said shield from affecting said electromagnetic field.

* * * * *